(12) United States Patent
Chen (10) Patent No.: US 11,126,290 B2
(45) Date of Patent: Sep. 21, 2021

(54) PIXEL ARRAY SUBSTRATE AND METHOD OF DRIVING THE SAME

(71) Applicant: Au Optronics Corporation, Hsinchu (TW)

(72) Inventor: Kuan-Yu Chen, Hsinchu (TW)

(73) Assignee: Au Optronics Corporation, Hsinchu (TW)

( * ) Notice: Subject to any disclaimer, the term of this patent is extended or adjusted under 35 U.S.C. 154(b) by 161 days.

(21) Appl. No.: 16/441,001

(22) Filed: Jun. 14, 2019

(65) Prior Publication Data

US 2020/0183522 A1 Jun. 11, 2020

(30) Foreign Application Priority Data

Dec. 11, 2018 (TW) ................................. 107144637

(51) Int. Cl.
*G06F 3/041* (2006.01)
*G06F 3/044* (2006.01)

(52) U.S. Cl.
CPC ............ *G06F 3/0412* (2013.01); *G06F 3/044* (2013.01); *G06F 3/0416* (2013.01); *G06F 3/0443* (2019.05); *G06F 2203/04103* (2013.01); *G06F 2203/04104* (2013.01)

(58) Field of Classification Search
CPC .... G06F 3/0412; G06F 3/0443; G06F 3/0416; G06F 3/044; G06F 2203/04103; G06F 2203/04104; G06F 2203/04111
USPC .................................................. 345/173, 174
See application file for complete search history.

(56) References Cited

U.S. PATENT DOCUMENTS

| 9,671,905 | B2 | 6/2017 | Noguchi et al. | |
|---|---|---|---|---|
| 10,133,409 | B2 | 11/2018 | Shi | |
| 2012/0050217 | A1 | 3/2012 | Noguchi et al. | |
| 2013/0335365 | A1* | 12/2013 | Kim | G06F 3/0445 345/174 |
| 2014/0111710 | A1* | 4/2014 | Yang | G06F 3/0443 349/12 |
| 2014/0118299 | A1* | 5/2014 | Wang | G06F 3/04166 345/174 |
| 2016/0188040 | A1* | 6/2016 | Shin | G06F 3/0443 345/174 |

(Continued)

FOREIGN PATENT DOCUMENTS

| CN | 106020545 | 10/2016 |
|---|---|---|
| CN | 106598334 | 4/2017 |

(Continued)

*Primary Examiner* — Jason M Mandeville
(74) *Attorney, Agent, or Firm* — JCIPRNET (57) ABSTRACT

A pixel array substrate including first and second scan lines, first and second pixels, an auxiliary line and sensing units is provided. The first pixel and the second pixel are arranged between the first scan line and the second scan line in a first direction. Each of the first pixel and the second pixel has a pixel electrode. The first pixel and the second pixel are respectively electrically connected to the first scan line and the second scan line. The auxiliary line is disposed between the first pixel and the second pixel. Each sensing unit has a first electrode and a second electrode. A first sensing unit of the sensing units is overlapped with the auxiliary line, the pixel electrode of the first pixel and the pixel electrode of the second pixel. The auxiliary line is electrically connected to at least one of the first electrode and the second electrode.

21 Claims, 8 Drawing Sheets

(56) References Cited

U.S. PATENT DOCUMENTS

2018/0095583 A1 4/2018 Kim et al.
2018/0239485 A1 8/2018 Shi

FOREIGN PATENT DOCUMENTS

TW 201227476 7/2012
TW 201814461 4/2018

* cited by examiner

PIXEL ARRAY SUBSTRATE AND METHOD OF DRIVING THE SAME

CROSS-REFERENCE TO RELATED APPLICATION

This application claims the priority benefit of Taiwan application Ser. No. 107144637, filed on Dec. 11, 2018. The entirety of the above-mentioned patent application is hereby incorporated by reference herein and made a part of this specification.

BACKGROUND

Technical Field

The present invention relates to a pixel array substrate, and more particularly to a pixel array substrate having a touch function.

Description of Related Art

In recent years, touch functions have become an indispensable part of many life applications, especially mobile devices equipped with touch display panels, such as smart phones and tablet computers, are everywhere. According to the integration manner of the display panel and the touch technology, the touch display technology can be categorized into three types, i.e., out-cell, on-cell and in-cell, and the in-cell type touch technology has the advantage of easily thinned, and has gradually become the mainstream of touch display panels in recent years.

Further, the sensing manner of the in-cell type touch technology can be categorized into self-capacitance manner and mutual-capacitance manner, according to different architectures and driving modes, and the mutual-capacitance touch sensing technology has become the mainstream of in-cell type touch technology due to the advantage of multi-touch sensing. However, as the application size of the touch display technology is increased, parasitic capacitance between the mutual-capacitance touch electrodes (e.g., driving electrodes, sensing electrodes) and the signal lines of the display panel (e.g., data lines, scan lines) is also increased, thereby causing the touch sensing frequency to decrease. Therefore, while the mutual-capacitance touch display panel is large in size, how to improve the sensing frequency of the mutual-capacitance touch technology is one of the problems that the panel manufacturer is trying to solve.

SUMMARY

At least one embodiment of the present invention provides a pixel array substrate with a touch function, which has good performance.

At least one embodiment of the present invention provides a method for driving a pixel array substrate, so that the detection frequency of the touch sensing of the pixel array substrate is high.

The pixel array substrate of the present invention includes a substrate, first and second scan lines, a data line, first and second pixels, a first auxiliary line, and a plurality of sensing units. The first scan line and the second scan line are arranged on the substrate in a first direction. The data line is disposed across the first scan line and the second scan line. The first pixel and the second pixel are arranged between the first scan line and the second scan line in the first direction. Each of the first pixel and the second pixel has a pixel electrode. The first pixel and the second pixel are electrically connected to the first scan line and the second scan line, respectively. At least one of the first pixel and the second pixel is electrically connected to the data line. The first auxiliary line is disposed between the first pixel and the second pixel. The plurality of sensing units are arranged on the substrate, and each of the sensing units has a first electrode and a second electrode. The first sensing unit of the plurality of sensing units is overlapped with the first auxiliary line, the pixel electrode of the first pixel, and the pixel electrode of the second pixel. The first auxiliary line is electrically connected to at least one of the first electrode and the second electrode of the first sensing unit.

The method of driving the pixel array substrate of the present invention comprises the following steps. The pixel array substrate as described above is provided. During a display time, each of the first scan line and the second scan line is applied with a gate drive signal, and each of the first electrode and the second electrode of each of the sensing units is applied with a first signal, wherein in each sensing unit, the first signal transmitted by the first electrode is synchronized with the first signal transmitted by the second electrode. During a touch time, each of the first scan line, the second scan line, the data line and the second electrodes is applied with a second signal, and the first electrode of each sensing unit is applied with a third signal, wherein the second signal transmitted by the first scan line, the second signal transmitted by the second scan line, the second signal transmitted by the data line, and the second signal transmitted by one of the second electrodes are synchronized with each other.

Based on the above, in the pixel array substrate of at least one embodiment of the present invention, two adjacent pixels are disposed between two adjacent scan lines, two adjacent pixels are respectively electrically connected to two adjacent scan lines, and the first auxiliary line disposed between two adjacent pixels is electrically connected to at least one of the first electrode and the second electrode of the sensing unit, thereby reducing the overall resistance of the sensing unit and improving the detection frequency of the touch sensing. In addition, in the method of driving the pixel array substrate of the embodiment of the present invention, during the touch time, the scan line, the data line, and the second electrode are applied with the touch sensing signals and the touch sensing signal transmitted by the scan line, the touch sensing signal transmitted by the data line, and touch sensing signal transmitted by the second electrode are synchronized with each other, thereby reducing the parasitic capacitance between the second electrode and the scan line and the parasitic capacitance between the second electrode and the data line, and improving the detection frequency of the touch sensing.

To make the above features and advantages of the disclosure more comprehensible, several embodiments accompanied with drawings are described in detail as follows.

DESCRIPTION OF THE EMBODIMENTS

As used herein, "about," "approximately," "essentially" or "substantially" is inclusive of the stated value and means within an acceptable range of deviation for the particular value as determined by persons of ordinary skill in the art, considering the measurement in question and the error associated with measurement of the particular quantity (i.e., the limitations of the measurement system). For example, "about" may mean within one or more standard deviations, or within, for example, ±30%, ±20%, ±15%, ±10%, ±5% of the stated value. Moreover, a relatively acceptable range of deviation or standard deviation may be chosen for the term "about," "approximately," "essentially" or "substantially" as used herein based on measurement properties, cutting properties or other properties, instead of applying one standard deviation across all the properties.

In the accompanying drawings, thicknesses of layers, films, panels, regions and so on are exaggerated for clarity. It should be understood that when an element such as a layer, film, region or substrate is referred to as being "on" or "connected to" another element, it can be directly on or connected to the other element, or intervening elements may also be present. In contrast, when an element is referred to as being "directly on" or "directly connected to" another element, there are no intervening elements present. As used herein, the term "connected" may refer to physically connected and/or electrically connected (or coupled). Therefore, the electrical connection (or coupling) may be refer an intervening elements exist between two elements.

References of the exemplary embodiments of the invention are made in detail. Examples of the exemplary embodiments are illustrated in the drawings. If possible, the same reference numerals in the drawings and the descriptions are indicated the same or similar parts.

Figure 1:
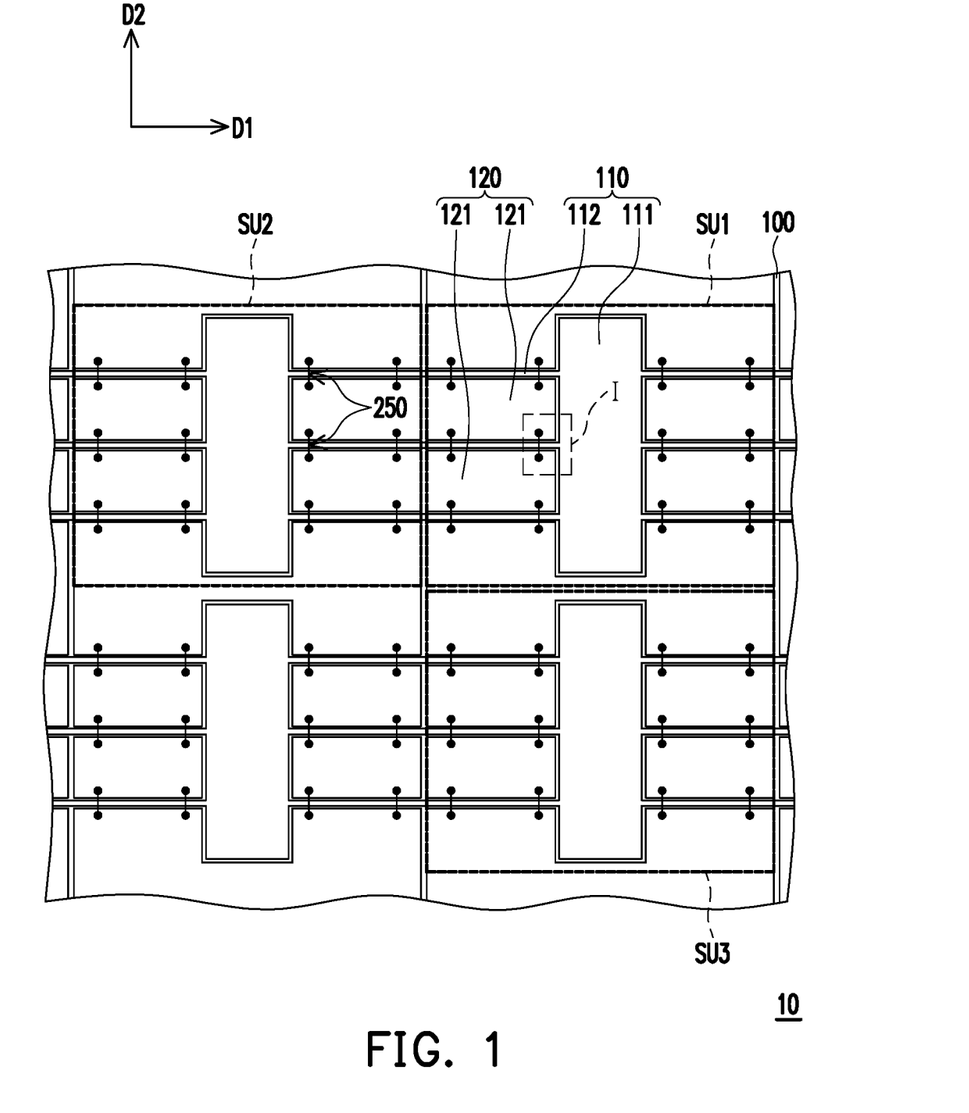
FIG. 1 is a top plan view of a pixel array substrate according to an embodiment of the present invention.
Figure 2:
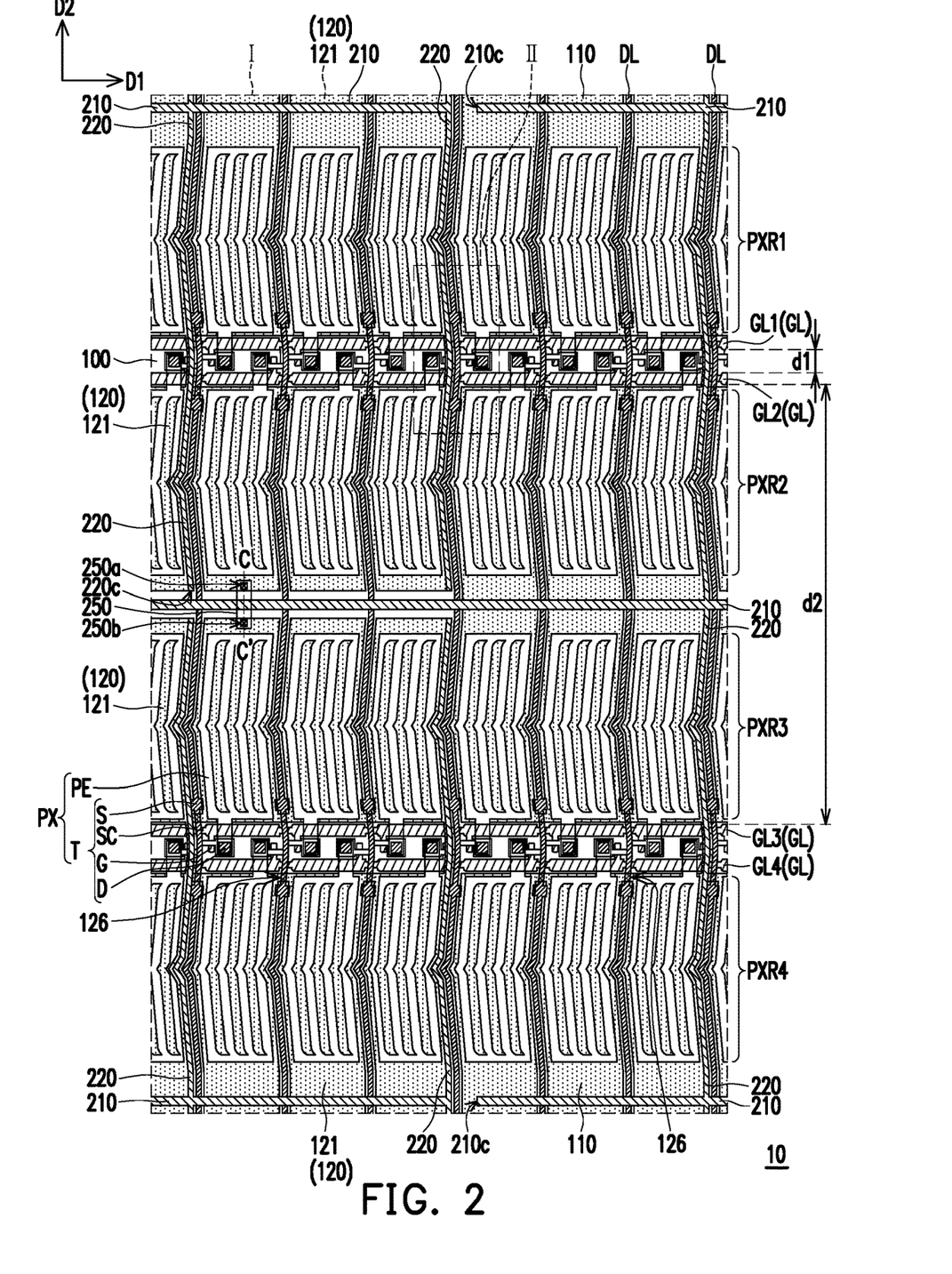
FIG. 2 is an enlarged schematic view showing a partial region I of the pixel array substrate of FIG. 1.
Figure 3:
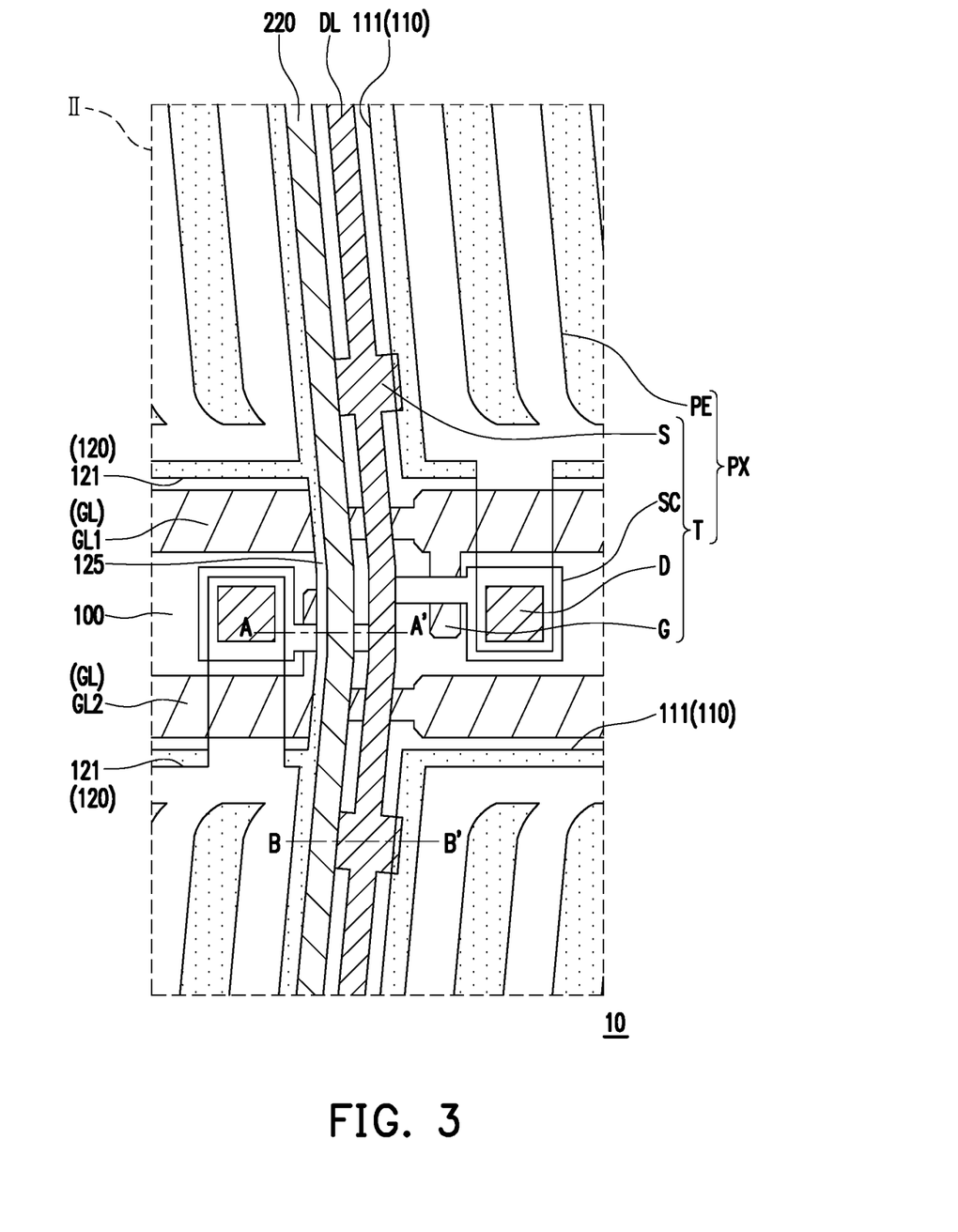
FIG. 3 is an enlarged schematic view showing a partial region II of the pixel array substrate of FIG. 2.
Figure 4:
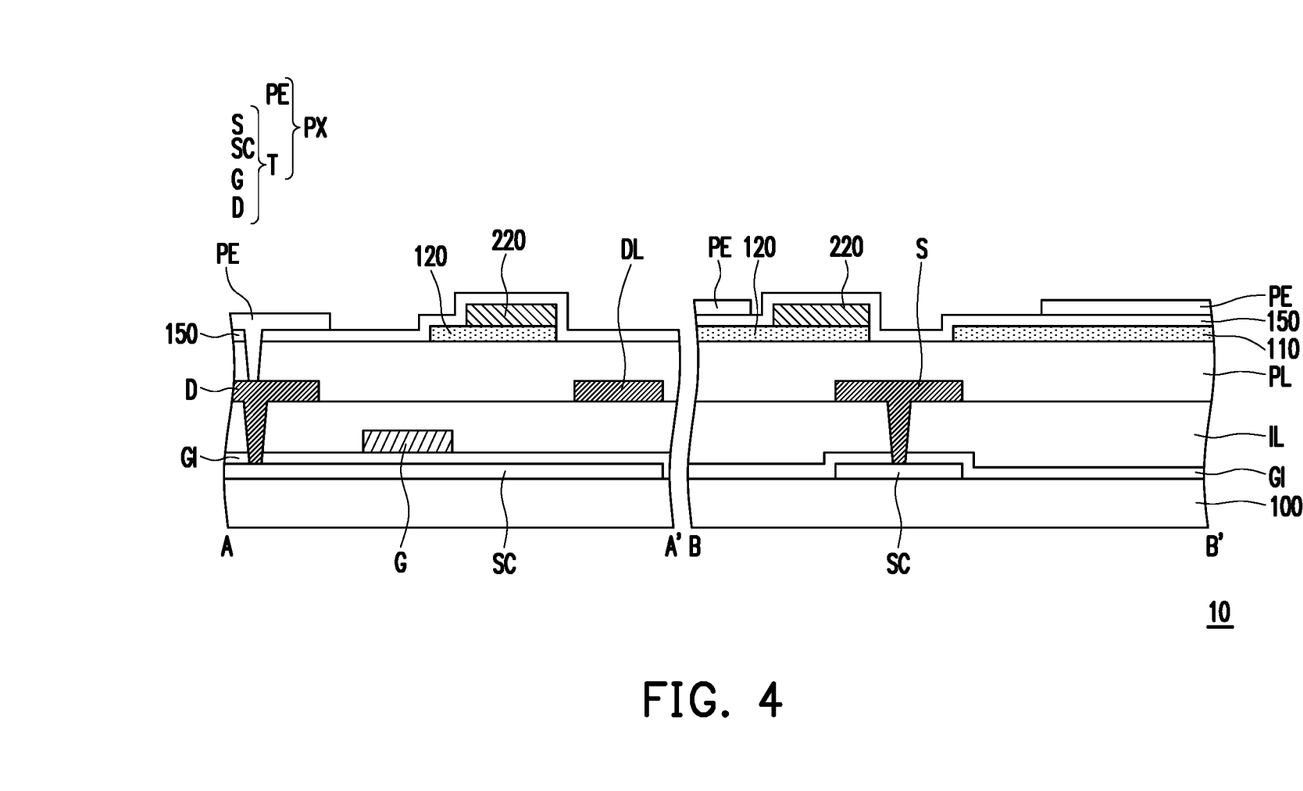
FIG. 4 is a cross-sectional view of the pixel array substrate of FIG. 3.

FIG. 1 is a top plan view of a pixel array substrate 10 in accordance with an embodiment of the present invention. FIG. 2 is an enlarged schematic view showing a partial region I of the pixel array substrate 10 of FIG. 1. FIG. 3 is an enlarged schematic view showing a partial region II of the pixel array substrate 10 of FIG. 2. In particular, for the sake of clarity, the scan lines GL, the data lines DL, the pixel electrodes PE, the active elements T, the first auxiliary lines 210, and the second auxiliary lines 220 of FIG. 2 are omitted in FIG. 1, and, the gate insulating layer GI, the interlayer insulating layer IL, the planarization layer PL, and the insulating layer 150 of FIG. 4 are omitted in FIG. 2 and FIG. 3.

Referring to FIG. 1, the pixel array substrate 10 includes a substrate 100 and a plurality of sensing units arranged in an array on the substrate 100. However, in order to clearly describe the individual components, FIG. 1 is exemplarily illustrated by only four sensing units. Each of the sensing units has a first electrode 110 and a second electrode 120, and a vertical projection of the first electrode 110 on the substrate 100 and a vertical projection of the second electrode 120 on the substrate 100 are spaced apart from each other. In this embodiment, the first electrode 110 is, for example, a transmission electrode of a touch driving signal, and the second electrode 120 is, for example, a receiving electrode of a touch sensing signal. That is, the sensing unit may be a touch sensing unit. Further, the sensing unit of the embodiment is, for example, a mutual-capacitance touch sensing unit.

As can be seen from FIG. 1, the plurality of sensing units include, for example, a first sensing unit SU1, a second sensing unit SU2, and a third sensing unit SU3. The first sensing unit SU1 and the second sensing unit SU2 are arranged in a row in a direction D1, and the first electrode 110 of the first sensing unit SU1 is electrically connected to the first electrode 110 of the second sensing unit SU2. The first sensing unit SU1 and the third sensing unit SU3 are arranged in a row along a direction D2, and the second electrode 120 of the first sensing unit SU1 is electrically connected to the second electrode 120 of the third sensing unit SU3.

In the present embodiment, the first electrode 110 may include a main portion 111 and a plurality of connecting portions 112 respectively protruding from opposite sides of the main portion 111 and extending in the direction D1. For example, some of the connecting portions 112 of the first electrode 110 of the first sensing unit SU1 are protruded from the main portion 111 toward the second sensing unit SU2, and are respectively connected to some of the connecting portions 112 of the first electrode 110 of the second sensing unit SU2 at one side of the main portion 111 facing the first sensing unit SU1. In other words, two main portions 111 of two first electrodes 110 of two adjacent sensing units arranged in the direction D1 are electrically connected to each other through the plurality of connecting portions 112 located between the two main portions 111.

It should be noted that, in this embodiment, the number of the connecting portions 112 of the first electrode 110 of each sensing unit is, for example, six. However, the present invention is not limited thereto. According to other embodiments, the number of the connecting portions 112 of the first electrode 110 of each sensing unit may be two, four, eight or more than eight. In addition, in the embodiment, the second electrode 120 may include a plurality of sub-portions 121. The plurality of sub-portions 121 are spaced apart from each other and are sequentially arranged in the direction D2. For example, in each sensing unit, the plurality of sub-portions 121 of the second electrode 120 and the plurality of connecting portions 112 of the first electrode 110 may be alternately arranged in the direction D2, but the invention is not limited thereto.

Referring to FIG. 2, the pixel array substrate 10 further includes a plurality of scan lines GL and a plurality of data lines DL. The plurality of scan lines GL may be sequentially arranged in the direction D2 on the substrate 100 and extend along the direction D1. The plurality of data lines DL may be sequentially arranged in the direction D1 on the substrate 100 and extend substantially along the direction D2. In addition, for the sake of clarity, the pixel array substrate 10 shown in FIG. 2 is exemplified by only four scan lines GL1, GL2, GL3, and GL4, and the present invention is not limited thereto. In this embodiment, a pitch d1 is between the vertical projection of the scan line GL1 on the substrate 100 and the vertical projection of the scan line GL2 on the substrate 100, or between the vertical projection of the scan line GL3 on the substrate 100 and the vertical projection of the scan line GL4 on the substrate 100. In this embodiment, a pitch d2 is between the vertical projection of the scan line GL2 on the substrate 100 and the vertical projection of the scan line GL3 on the substrate 100, and the pitch d1 is smaller than the pitch d2.

As can be seen from FIG. 1 and FIG. 2, the vertical projection of the region occupied by each sensing unit on the substrate 100 overlaps the vertical projection of the plurality of scan lines GL and the vertical projection of the plurality of data lines DL on the substrate 100. In particular, in this embodiment, the ratio of the vertical projected area of the first electrode 110 of each sensing unit on the substrate 100 to the vertical projected area of the region occupied by each sensing unit on the substrate 100 may be less than 30%. In this way, the parasitic capacitance between the first electrode 110 of each sensing unit and the scan lines GL and the parasitic capacitance between the first electrode 110 of each sensing unit and the data lines DL can be reduced, which helps to improve the detection frequency of the touch sensing.

In the present embodiment, the scan lines GL and the data lines DL are generally made of a metal material based on conductivity considerations. However, the present invention is not limited thereto. According to other embodiments, the scan lines GL and the data lines DL may be made of, for example, other conductive materials such as an alloy, a nitride of a metal material, an oxide of a metal material, an oxynitride of a metal material, other suitable materials, or a stacked layer of said metal material and said other conductive materials described above.

The pixel array substrate 10 further includes a plurality of pixels PX arranged in an array on the substrate 100. In this embodiment, the plurality of pixels PX may be arranged into a plurality of pixel rows in the direction D1, and the pixel rows, for example, include a first pixel row PXR1, a second pixel row PXR2, a third pixel row PXR3, and a fourth pixel row PXR4. The plurality of pixel rows are sequentially arranged in the direction D2, and are respectively electrically connected to the corresponding one of the scan lines. For example, two adjacent pixels PX in the direction D2 may be electrically connected to two data lines DL on opposite sides of the two adjacent pixels PX, respectively, but the present invention is not limited thereto. In some embodiments, the two adjacent pixels PX in the direction D2 may be electrically connected to the data lines DL on the same side of the two adjacent pixels PX.

Further, each pixel PX includes an active element T and a pixel electrode PE, and the active element T is electrically connected to the corresponding one of the data lines DL and the corresponding one of the scan lines GL. In this embodiment, the vertical projection of the first electrode 110 and the second electrode 120 of each sensing unit on the substrate 100 may overlap the vertical projection of the plurality of pixel electrodes PE of the plurality of pixels PX on the substrate 100. In addition, the vertical projection of the first electrode 110 and the second electrode 120 of each sensing unit on the substrate 100 does not substantially overlap the data lines DL and the scan lines GL. As such, the parasitic capacitance between the first electrode 110 of each sensing unit and the data lines DL, the parasitic capacitance between the first electrode 110 of each sensing unit and the scan lines GL, the parasitic capacitance between the second electrode 120 of each sensing unit and the data lines DL, and the parasitic capacitance between the second electrode 120 of each sensing unit and the scan lines GL can be reduced.

As can be seen from FIG. 2 and FIG. 3, two parts of the second electrode 120, which are respectively located at the upper side of the scan line GL1 and the lower side of the scan line GL2 and are respectively overlapped with the first pixel row PXR1 and the second pixel row PXR2, are electrically connected to each other through a connecting portion 125. In addition, two parts of the second electrode 120, which are respectively located at two sides of the data line DL and are respectively overlapped with the pixel electrodes PE of two adjacent pixels PX, are electrically connected to each other through a connecting portion 126. It can be seen from FIG. 2 that the two parts of the first electrode 110, which are respectively located at the upper and lower sides of the two adjacent scan lines GL, can be electrically connected to each other through a component similar or identical to the connecting portion 125, and the two parts of the first electrode 110, which are respectively located at two sides of the data line DL, can also be electrically connected to each other through a component similar or identical to the connecting portion 126.

In particular, in the present embodiment, the first electrode 110 and the second electrode 120 of each sensing unit can also serve as a common electrode of the plurality of pixels PX. For detailed description, please refer to the following related paragraphs.

In this embodiment, the first electrodes 110, the second electrodes 120, and the pixel electrodes PE may be transmissive electrodes, and the material of the transmissive electrodes may include a metal oxide, such as indium tin oxide (ITO), indium zinc oxide (IZO), aluminum tin oxide (ATO), aluminum zinc oxide (AZO), indium gallium zinc oxide (IGZO), or other suitable oxides, or a stacked layer of at least two of the aforesaid materials, but the invention is not limited thereto. According to other embodiments, the first electrodes 110, the second electrodes 120, and the pixel electrodes PE may be made of, for example, other conductive materials, such as metal, an alloy, a nitride of a metal material, an oxide of a metal material, an oxynitride of a metal material, other suitable materials, or a stacked layer of said metal material and said other conductive materials described above.

Moreover, as can be seen from FIG. 2, the scan line GL1 and the scan line GL2 are disposed between the first pixel row PXR1 and the second pixel row PXR2, and the scan line GL3 and the scan line GL4 are disposed between the third pixel row PXR3 and the fourth pixel row PXR4. The first pixel row PXR1 and the second pixel row PXR2 are respectively electrically connected to the scan line GL1 and the scan line GL2, and the third pixel row PXR3 and the fourth pixel row PXR4 are respectively electrically connected to the scan line GL3 and the scan line GL4. From another point of view, the second pixel row PXR2 and the third pixel row PXR3 are disposed between the scan line GL2 and the scan line GL3. That is, there is no scan line disposed between the second pixel row PXR2 and the third pixel row PXR3, which provides additional layout space to arrange additional lines.

The pixel array substrate 10 further includes a plurality of first auxiliary lines 210 extending in the direction D1. One of the first auxiliary lines 210 is disposed between the second pixel row PXR2 and the third pixel row PXR3. That is, the region between the second pixel row PXR2 and the third pixel row PXR3 can be used to arrange the first auxiliary line 210. Further, the first pixel row PXR1, the second pixel row PXR2, the third pixel row PXR3 and the fourth pixel row PXR4 of FIG. 2 may constitute a repeating unit, and a plurality of repeating units are arranged in the direction D2 on the substrate 100 to form the plurality of pixel rows of the pixel array substrate 10. That is, the region between the second pixel row PXR2 and the third pixel row PXR3 of each repeating unit may be used to arrange the first auxiliary line 210.

In this embodiment, the vertical projection of the first auxiliary lines 210 on the substrate 100 may overlap the vertical projection of the first electrode 110 and the second electrode 120 of each sensing unit on the substrate 100. In this embodiment, at least one of the first electrode 110 and the second electrode 120 of the sensing unit is electrically connected to the first auxiliary line 210. In particular, the first auxiliary line 210 disposed corresponding to a boundary region between the first electrode 110 and the second electrode 120 has a disconnection opening 210c at the boundary region, so that a portion of the first auxiliary line 210 overlapping the first electrode 110 and another portion of the first auxiliary line 210 overlapping the second electrode 120 are electrically independent from each other. In some embodiments, the first auxiliary line 210 may extend between two adjacent sensing units (e.g., the first sensing unit SU1 and the second sensing unit SU2), and then the first auxiliary line 210 may have another disconnection opening (not shown) at a boundary region between the two second electrodes 120 of two adjacent sensing units.

In addition, the pixel array substrate 10 may optionally include a plurality of second auxiliary lines 220. The vertical projection of the second auxiliary lines 220 on the substrate 100 does not overlap the vertical projection of the data lines DL on the substrate 100. For example, the second auxiliary line 220 may conformally extend at one side of the corresponding one of the data lines DL, thereby helping to reduce the parasitic capacitance between the second auxiliary line 220 and the data line DL, but the present invention is not limited thereto. In other embodiments, the vertical projection of the second auxiliary lines 220 on the substrate 100 may overlap the vertical projection of the data lines DL on the substrate 100. As can be seen from FIG. 2, in the pixel array substrate 10, one second auxiliary line 220 may be disposed between every three pixels PX in the direction D1. However, the present invention is not limited thereto. In some embodiments, in the pixel array substrate 10, one second auxiliary line 220 may be disposed between every two pixels PX in the direction D1. In other embodiments, in the pixel array substrate 10, one second auxiliary line 220 may be disposed between every four pixels PX in the direction D1.

In this embodiment, the vertical projection of the second auxiliary lines 220 on the substrate 100 may overlap the vertical projection of the first electrode 110 and the second electrode 120 of each sensing unit on the substrate 100. In this embodiment, at least one of the first electrode 110 and the second electrode 120 of the sensing unit is electrically connected to the second auxiliary line 220. For example, the first auxiliary line 210 and the second auxiliary line 220 may belong to the same conductive layer. Therefore, the second auxiliary line 220 disposed corresponding to any two adjacent sub-portions 121 of each second electrode 120 has a disconnection opening 220c between the any two adjacent sub-portions 121, so that the first auxiliary line 210 electrically connected to the first electrode 110 can extend through the disconnection opening 220 of the second auxiliary line 220. As such, the first electrode 110 electrically connected to the first auxiliary line 210 is electrically independent from the second electrode 120 electrically connected to the second auxiliary line 220. In addition, in this embodiment, the second auxiliary line 220 may further extend between the first electrode 110 and the second electrode 120 of the sensing unit, and then the second auxiliary line 220 may have another disconnection opening (not shown) at a boundary region between the first electrode 110 and the second electrode 120.

In particular, the first auxiliary line 210 and the second auxiliary line 220 electrically connected to the same first electrode 110 (or the same second electrode 120) may directly connected to each other. That is, the plurality of first auxiliary lines 210 and the plurality of second auxiliary lines 220 electrically connected to the same first electrode 110 (or the same second electrode 120) may substantially form a mesh structure, but the invention is not limited thereto.

In the present embodiment, the first auxiliary lines 210 and the second auxiliary lines 220 are generally made of a metal material based on conductivity considerations. However, the present invention is not limited thereto. According to other embodiments, the first auxiliary lines 210 and the second auxiliary lines 220 may be made of, for example, other conductive materials, such as an alloy, a nitride of a metal material, an oxide of a metal material, an oxynitride of a metal material, other suitable materials, or a stacked layer of said metal material and said other conductive materials described above.

Figure 5:
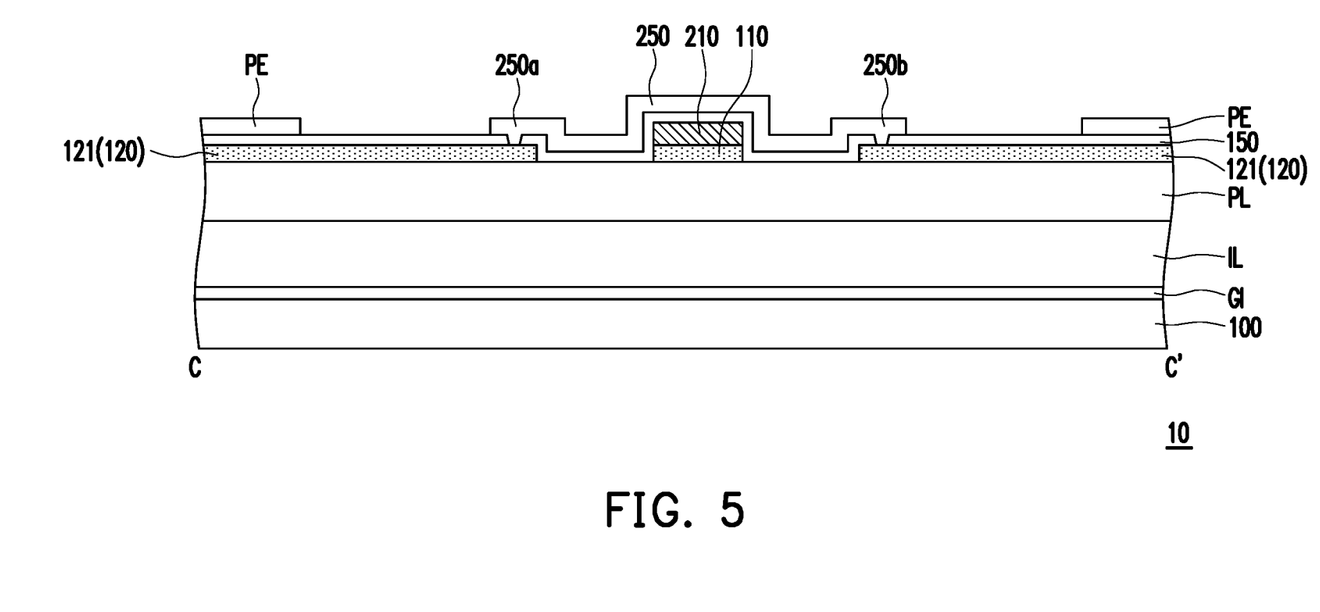
FIG. 5 is a cross-sectional view of the pixel array substrate of FIG. 2.

FIG. 4 is a cross-sectional view of the pixel array substrate 10 of FIG. 3. FIG. 5 is a cross-sectional view of the pixel array substrate 10 of FIG. 2. In particular, FIG. 4 corresponds to the section line A-A' and the section line B-B' of FIG. 3, and FIG. 5 corresponds to the section line C-C' of FIG. 2.

Referring to FIG. 2 and FIG. 4, the active element T has a gate G, a source S, a drain D, and a semiconductor pattern SC. The pixel array substrate 10 further includes a gate insulating layer GI disposed between the gate G and the semiconductor pattern SC. For example, in this embodiment, the gate G of the active element T may be disposed over the semiconductor pattern SC to form a top-gate thin-film transistor (top-gate TFT), but the present invention is not limited thereto. According to other embodiments, the gate G of the active element T may be disposed under the semiconductor pattern SC to form a bottom-gate TFT. In this embodiment, the gates G and the scan lines GL may belong to the same film layer, and the sources S, the drains D, and the data lines DL may belong to the same film layer, but the present invention is not limited thereto.

In the present embodiment, the pixel array substrate 10 further includes an interlayer insulating layer IL covering the gate G of the active element T. The source S and the drain D of the active element T are disposed on the interlayer insulating layer IL, and are respectively overlapped with different two regions of the semiconductor pattern SC. Specifically, the source S and the drain D penetrate the interlayer insulating layer IL and the gate insulating layer GI, so as to be respectively electrically connected to different regions of the semiconductor pattern SC. In the present embodiment, the material of the semiconductor pattern SC is, for example, a polycrystalline silicon semiconductor. That is, the active element T may be a polycrystalline silicon TFT. However, the present invention is not limited thereto. In other embodiments, the material of the semiconductor pattern SC is, for example, an amorphous silicon semiconductor or a metal oxide semiconductor, which means that the active element T may be an amorphous silicon TFT (a-Si TFT) or a metal oxide TFT.

In the present embodiment, the gate G, the source S, the drain D, the gate insulating layer GI, and the interlayer insulating layer IL may each be implemented by any gate, any source, any drain, any gate insulating layer and any interlayer insulating layer used for a display device well-known for those having ordinary skill in the art, and the gate G, the source S, the drain D, the gate insulating layer GI and the interlayer insulating layer IL may each be formed by any process well-known for those having ordinary skill in the art, and thus will not be described herein.

As can be seen from FIG. 4 and FIG. 5, the pixel array substrate 10 further includes a planarization layer PL covering the source S and the drain D of the active element T, the data line DL and a portion of the surface of the interlayer insulating layer IL. In this embodiment, the first electrode 110 and the second electrode 120 of each sensing unit may be disposed on the planarization layer PL, but the invention is not limited thereto. For example, the first electrode 110 and the second electrode 120 of each sensing unit may belong to the same conductive layer. In this embodiment, the material of the planarization layer PL may include an inorganic material (such as, silicon oxide, silicon nitride, silicon oxynitride, other suitable materials, or a stacked layer of at least two materials), an organic material, other suitable materials, or a combination of the above.

In particular, the first auxiliary line 210 may directly cover and electrically connect the first electrode 110 (or the second electrode 120), and the second auxiliary line 220 may directly cover and electrically connect the second electrode 120 (or the first electrode 110). The pixel array substrate 10 further includes an insulating layer 150 covering the first electrode 110, the second electrode 120, the first auxiliary line 210, the second auxiliary line 220, and a portion of the surface of the planarization layer PL. In this embodiment, the pixel electrode PE of each pixel PX may be disposed on the insulating layer 150, and may be electrically connected to the drain D of the active element T by penetrating the insulating layer 150 and the planarization layer PL, but the invention is not limited to this.

Referring to FIG. 2 and FIG. 5, the pixel array substrate 10 may further include a plurality of bridge patterns 250, and each bridge pattern 250 is electrically connected between the two adjacent sub-portions 121 of the second electrode 120 in the direction D2. In this embodiment, the bridge pattern 250 may be disposed on the insulating layer 150, and the opposite end portions 250a, 250b of the bridge pattern 250 respectively electrically connect two adjacent sub-portions 121 of the second electrode 120 in the direction D2 by penetrating the insulating layer 150, but the invention is not limited thereto. For example, the bridge pattern 250 and the pixel electrode PE may belong to the same conductive layer, but the invention is not limited thereto.

Figure 6:
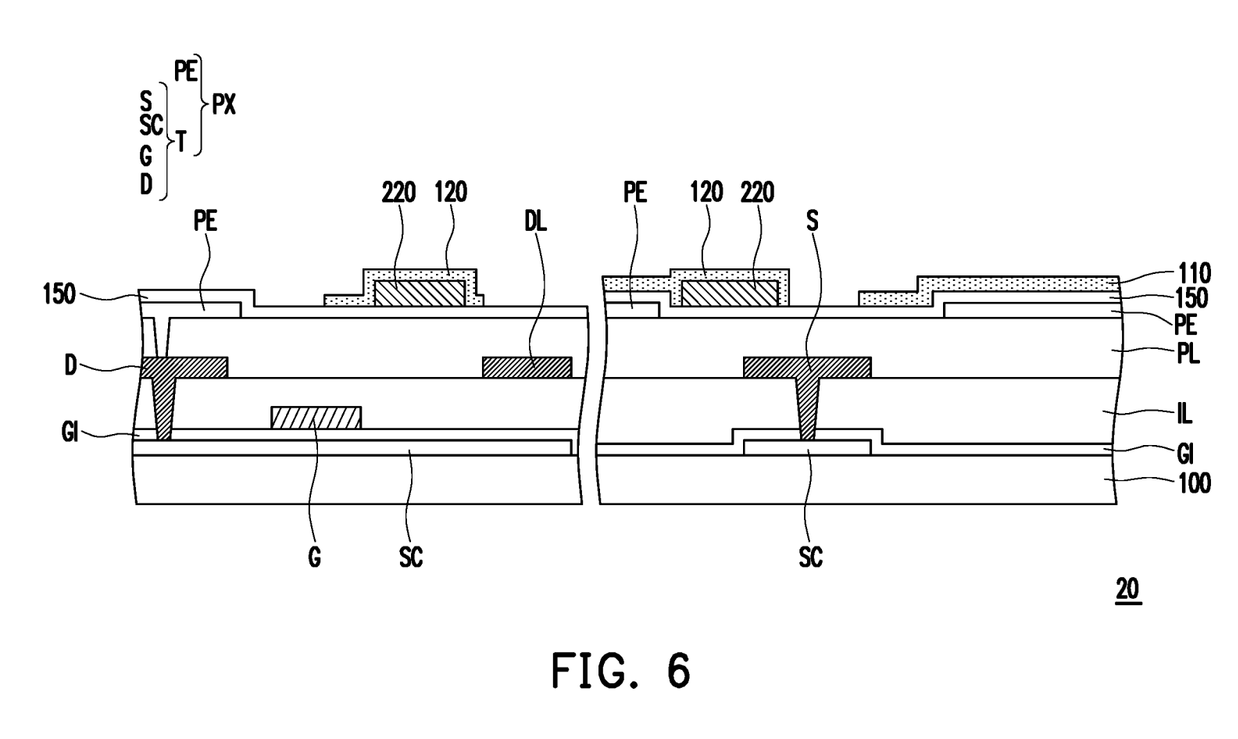
FIG. 6 is a cross-sectional view of a pixel array substrate according to another embodiment of the present invention.

FIG. 6 is a cross-sectional view of a pixel array substrate 20 according to another embodiment of the present invention. Since the components of the pixel array substrate 20 of FIG. 6 are similar or identical to the components of the pixel array substrate 10 of FIG. 4, the connection relationships between the components of the pixel array substrate 20 and the types of the materials of the components of the pixel array substrate 20 can be referred to the related descriptions of the pixel array substrate 10 in the aforementioned embodiment, and the detailed descriptions thereof are not repeated in the following embodiment.

Referring to FIG. 4 and FIG. 6, the difference between the pixel array substrate 20 of the present embodiment and the pixel array substrate 10 of FIG. 3 lies in that the pixel electrode PE of each pixel PX of the pixel array substrate 20 is disposed between the substrate 100 and the first electrode 110 (or the second electrode 120) of each sensing unit, and the first electrode 110 and the second electrode 120 are disposed on the insulating layer 150. In short, the pixel PX of the pixel array substrate 20 is in a type of top common electrode.

Figure 7:
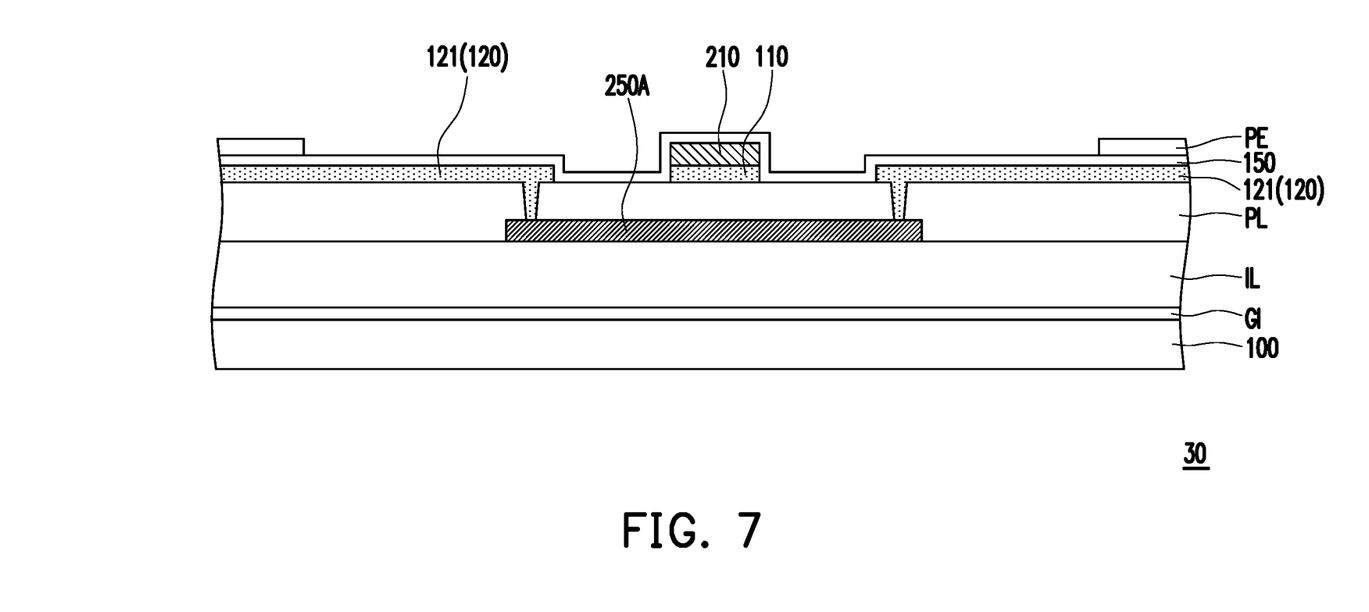
FIG. 7 is a cross-sectional view of a pixel array substrate according to still another embodiment of the present invention.

FIG. 7 is a cross-sectional view of a pixel array substrate 30 according to still another embodiment of the present invention. Since the components of the pixel array substrate 30 of FIG. 7 are similar or identical to the components of the pixel array substrate 10 of FIG. 5, the connection relationships between the components of the pixel array substrate 30 and the types of the materials of the components of the pixel array substrate 30 can be referred to the related descriptions of the pixel array substrate 10 in the aforementioned embodiment, and the detailed descriptions thereof are not repeated in the following embodiment.

Referring to FIG. 5 and FIG. 7, the difference between the pixel array substrate 30 of the present embodiment and the pixel array substrate 10 of FIG. 4 lies in that a bridge pattern 250A of the pixel array substrate 30 and the source S and the drain D of the active element T may belong to the same conductive layer. In detail, two adjacent sub-portions 121 of the second electrode 120 respectively penetrate the planarization layer PL to electrically connect the bridge patterns 250A.

Figure 8:
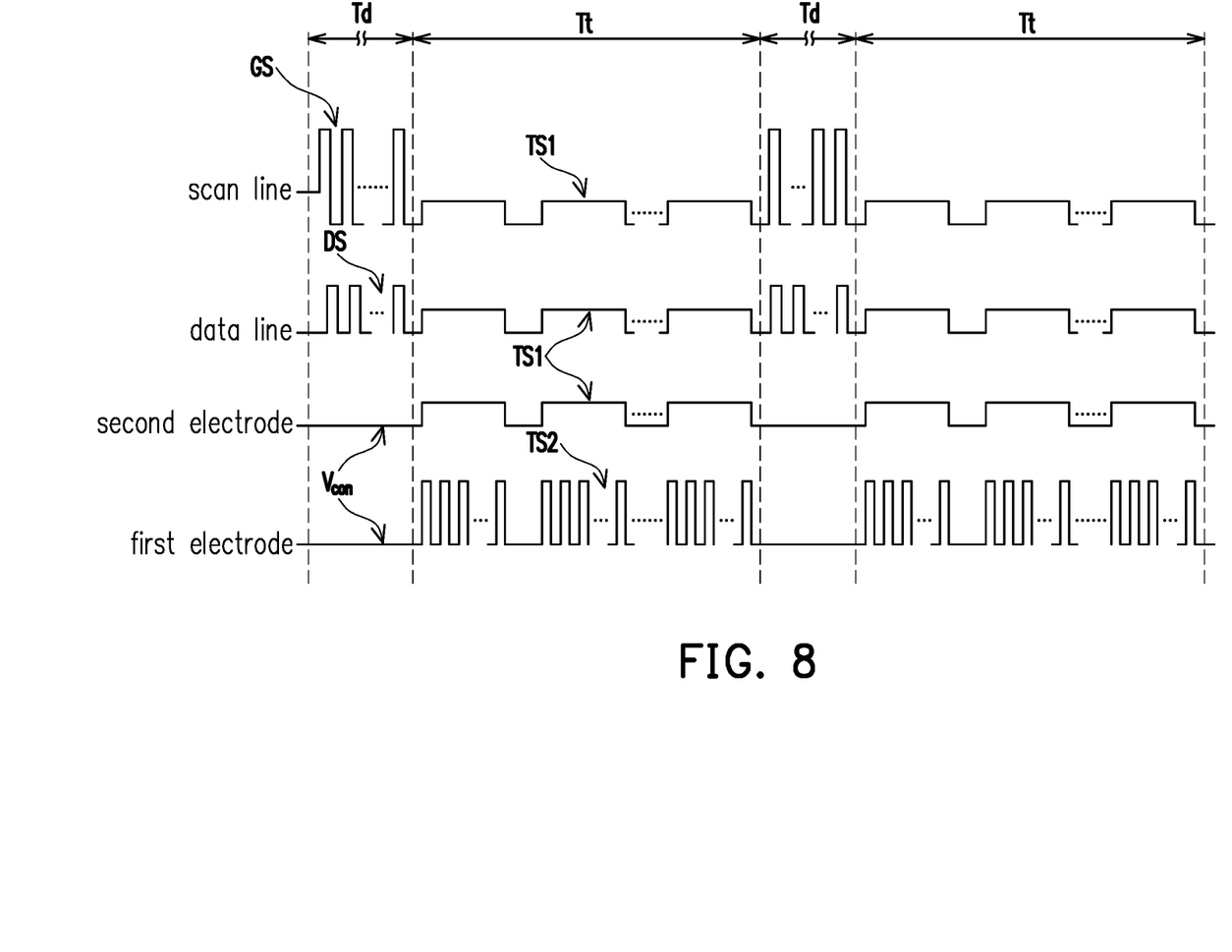
FIG. 8 is a schematic diagram of the signals applied to the scan lines, the data lines, the first electrodes, and the second electrodes of the pixel array substrate of FIG. 2 in time sequence.

FIG. 8 is a schematic diagram of the signals applied to the scan lines GL, the data lines DL, the first electrodes 110, and the second electrodes 120 of the pixel array substrate 10 of FIG. 2 in time sequence.

Referring to FIG. 8, in this embodiment, during the display time Td, the scan lines GL of the pixel array substrate 10 are respectively applied with gate driving signals GS and the data lines DL of the pixel array substrate 10 are respectively applied with display driving signals DS, so that the pixel electrode PE of each pixel PX has an independent display driving potential. In particular, during the display time Td, each of the first electrode 110 and the second electrode 120 of each sensing unit may be applied with a common potential $V_{com}$, and the common potential $V_{com}$ of the first electrode 110 is synchronized with the common potential $V_{com}$ of the second electrode 120. Thus, the potential difference between the display driving potential of each pixel electrode and the common potential $V_{com}$ can be applied to the display medium (e.g., liquid crystal molecules) of the touch display using the pixel array substrate 10, so that the pixel area where each pixel PX is located has a corresponding brightness to achieve the display effect. In the present embodiment, the common potential $V_{com}$ may be a ground potential or a fixed potential.

Then, each of the first electrodes 110 of the pixel array substrate 10 may be applied with a touch driving signal TS2 during the touch time Tt. In particular, each of the scan lines GL, the data lines DL, and the second electrodes 120 of the pixel array substrate 10 may be applied with a touch sensing signal TS1. In this embodiment, the touch sensing signal TS1 of one of the second electrodes 120, the touch sensing signal TS1 of the scan lines GL overlapped with the one of the second electrodes 120, and the touch sensing signal TS1 of the data lines GL overlapped with the one of the second electrodes 120 are synchronized with each other, so that the parasitic capacitance between the one second electrode 120 and the scan lines GL and the parasitic capacitance between the one second electrode 120 and the data lines DL can be reduced, thereby helping to improve the detection frequency of the touch sensing.

It should be noted that the above-mentioned driving method is exemplarily illustrated by taking the pixel array substrate 10 as an example. However, those having ordinary skill in the art should understand that the above-mentioned driving method can also be applied to the pixel array substrates of all the above-mentioned embodiments of the present invention, such as the pixel array substrate 20 and the pixel array substrate 30.

In summary, in the pixel array substrate of the embodiment of the present invention, two adjacent pixels are disposed between two adjacent scan lines, two adjacent pixels are respectively electrically connected to two adjacent scan lines, and the first auxiliary line disposed between two adjacent pixels is electrically connected to at least one of the first electrode and the second electrode of the sensing unit, thereby reducing the overall resistance of the sensing unit and improving the detection frequency of the touch sensing. In addition, in the method of driving the pixel array substrate of the embodiment of the present invention, during the touch time, the scan line, the data line, and the second electrode are applied with the touch sensing signals and the touch sensing signals transmitted by the scan line, the data line, and the second electrode are synchronized with each other, thereby reducing the parasitic capacitance between the second electrode and the scan line and the parasitic capacitance between the second electrode and the data line, and improving the detection frequency of touch sensing.

Although the disclosure has been described with reference to the above embodiments, it will be apparent to one of ordinary skill in the art that modifications to the described embodiments may be made without departing from the spirit of the disclosure. Accordingly, the scope of the disclosure will be defined by the attached claims and not by the above detailed descriptions.

What is claimed is:

1. A pixel array substrate, comprising:
    a substrate;
    a first scan line and a second scan line arranged on the substrate in a first direction;
    a data line disposed across the first scan line and the second scan line;
    a first pixel and a second pixel arranged in the first direction between the first scan line and the second scan line, wherein each of the first pixel and the second pixel has a pixel electrode, the first pixel and the second pixel are respectively electrically connected to the first scan line and the second scan line, and at least one of the first pixel and the second pixel is electrically connected to the data line;
    a first auxiliary line disposed between the first pixel and the second pixel; and
    a plurality of sensing units arranged on the substrate, wherein each of the sensing units has a first electrode and a second electrode, a first sensing unit of the sensing units overlaps the first auxiliary line, the pixel electrode of the first pixel, and the pixel electrode of the second pixel, and the first auxiliary line is electrically connected to at least one of the first electrode and the second electrode of the first sensing unit, wherein the first auxiliary line extends between two adjacent sensing units and has a disconnection opening at a boundary region between the two second electrodes of the two adjacent sensing units.

2. The pixel array substrate of claim 1, wherein in each of the sensing units, a ratio of a vertical projected area of the first electrode on the substrate to a vertical projected area of the sensing unit on the substrate is less than 30%.

3. The pixel array substrate of claim 1, further comprising:
    a third pixel, wherein the first pixel and the third pixel are arranged in a second direction, and the second direction intersects the first direction; and
    a second auxiliary line disposed between the first pixel and the third pixel, wherein an extending direction of the second auxiliary line intersects an extending direction of the first auxiliary line.

4. The pixel array substrate of claim 3, wherein a vertical projection of the second auxiliary line on the substrate does not overlap a vertical projection of the data line on the substrate.

5. The pixel array substrate of claim 3, wherein the first auxiliary line and the second auxiliary line belong to the same film layer.

6. The pixel array substrate of claim 5, wherein the second auxiliary line extends through the disconnection opening of the first auxiliary line.

7. The pixel array substrate of claim 1, wherein a second sensing unit of the sensing units is adjacent to the first sensing unit in a direction perpendicular to the first direction, and the first electrode of the first sensing unit is electrically connected to the first electrode of the second sensing unit.

8. The pixel array substrate of claim 7, wherein each of the first electrodes has a main portion and a plurality of connecting portions protruding from the main portion, and the connecting portions of the first sensing unit are respectively connected to the connecting portions of the second sensing unit.

9. The pixel array substrate of claim 8, wherein the connecting portions of the first sensing unit are connected to the connecting portions of the second sensing unit, and the connecting portions of the first sensing unit and the connecting portions of the second sensing unit are disposed between the main portion of the first sensing unit and the main portion of the second sensing unit.

10. The pixel array substrate of claim 1, wherein a third sensing unit of the sensing units and the first sensing unit are adjacently arranged in the first direction, and the second electrode of the first sensing unit is electrically connected to the second electrode of the third sensing unit.

11. The pixel array substrate of claim 1, further comprising at least one bridge pattern, wherein each of the second electrodes has two sub-portions spaced apart from each other, the two sub-sections are arranged on the substrate in the first direction, and the at least one bridge pattern is connected between the two sub-portions.

12. The pixel array substrate of claim 11, wherein the at least one bridge pattern and the pixel electrodes belong to the same film layer.

13. The pixel array substrate of claim 11, wherein each of the first pixel and the second pixel has an active element, and a source and a drain of the active element and the at least one bridge pattern belong to the same film layer.

14. The pixel array substrate of claim 1, wherein the first electrodes and the second electrodes belong to the same film layer.

15. The pixel array substrate of claim 1, wherein each of the pixel electrodes is disposed between the substrate and the first electrodes, and each of the pixel electrode is disposed between the substrate and the second electrodes.

16. The pixel array substrate of claim 1, wherein each of the first electrodes and the second electrodes is disposed between the substrate and the pixel electrodes.

17. The pixel array substrate of claim 1, wherein the first auxiliary line is directly connected to at least one of the first electrode and the second electrode of the first sensing unit.

18. A method of driving a pixel array substrate, comprising:
    providing a pixel array substrate according to claim 1;

during a display time, each of the first scan line and the second scan line being applied with a gate drive signal, and each of the first electrode and the second electrode of each of the sensing units being applied with a first signal, wherein the first signal transmitted by the first electrode is synchronized with the first signal transmitted by the second electrode; and during a touch time, each of the first scan line, the second scan line, the data line, and the second electrodes being applied with a second signal, and each of the first electrodes being applied with a third signal, wherein the second signal transmitted by the first scan line, the second signal transmitted by the second scan line, the second signal transmitted by the data line, and the second signal transmitted by one of the second electrodes are synchronized with each other.

19. The method according to claim 18, wherein the first signal is a common electrode signal during the display time.

20. The method according to claim 18, wherein during the touch time, the second signal is a touch sensing signal, and the third signal is a touch driving signal.

21. A pixel array substrate, comprising:
a substrate;
a first scan line and a second scan line arranged on the substrate in a first direction;
a data line disposed across the first scan line and the second scan line;
a first pixel and a second pixel arranged in the first direction between the first scan line and the second scan line, wherein each of the first pixel and the second pixel has a pixel electrode, the first pixel and the second pixel are respectively electrically connected to the first scan line and the second scan line, and at least one of the first pixel and the second pixel is electrically connected to the data line;
a first auxiliary line disposed between the first pixel and the second pixel; and
a plurality of sensing units arranged on the substrate, wherein each of the sensing units has a first electrode and a second electrode, a first sensing unit of the sensing units overlaps the first auxiliary line, the pixel electrode of the first pixel, and the pixel electrode of the second pixel, and the first auxiliary line is electrically connected to at least one of the first electrode and the second electrode of the first sensing unit, wherein the first auxiliary line is disposed corresponding to a boundary region between the first electrode and the second electrode of one of the sensing units and has a disconnection opening at the boundary region, so that a portion of the first auxiliary line overlapping the first electrode of the one of the sensing units and another portion of the first auxiliary line overlapping the second electrode of the one of the sensing units are electrically independent from each other.

* * * * *